United States Patent [19]
Bauer

[11] 4,196,929
[45] Apr. 8, 1980

[54] DOOR FOR A VEHICLE

[75] Inventor: Andreas Bauer, Wolfsburg, Fed. Rep. of Germany

[73] Assignee: Volkswagenwerk Aktiengesellschaft, Wolfsburg, Fed. Rep. of Germany

[21] Appl. No.: 924,800

[22] Filed: Jul. 14, 1978

[30] Foreign Application Priority Data

Aug. 31, 1977 [DE] Fed. Rep. of Germany ...... 2739178

[51] Int. Cl.² .............................................. B60J 1/00
[52] U.S. Cl. .................................. 296/31 R; 296/146
[58] Field of Search ..................... 296/146, 151, 31 A, 296/31 R; 49/483, DIG. 2

[56] References Cited

U.S. PATENT DOCUMENTS 2,438,185 3/1948 Prance .............................. 296/31 R

FOREIGN PATENT DOCUMENTS 1480089 9/1965 Fed. Rep. of Germany .

Primary Examiner—Philip Goodman
Attorney, Agent, or Firm—Brumbaugh, Graves, Donohue & Raymond

[57] ABSTRACT

A door for a vehicle, particularly a motor vehicle having a bumper, has an upper region made of sheet metal provided with a window opening and a lower region made of plastic material. Each region is formed by an individual, prefabricated component which is separately manufactured and subsequently assembled together with the other component. When assembled, the two components have overlapping, facing boundary zones which are connected together at the level of the vehicle bumper.

7 Claims, 5 Drawing Figures

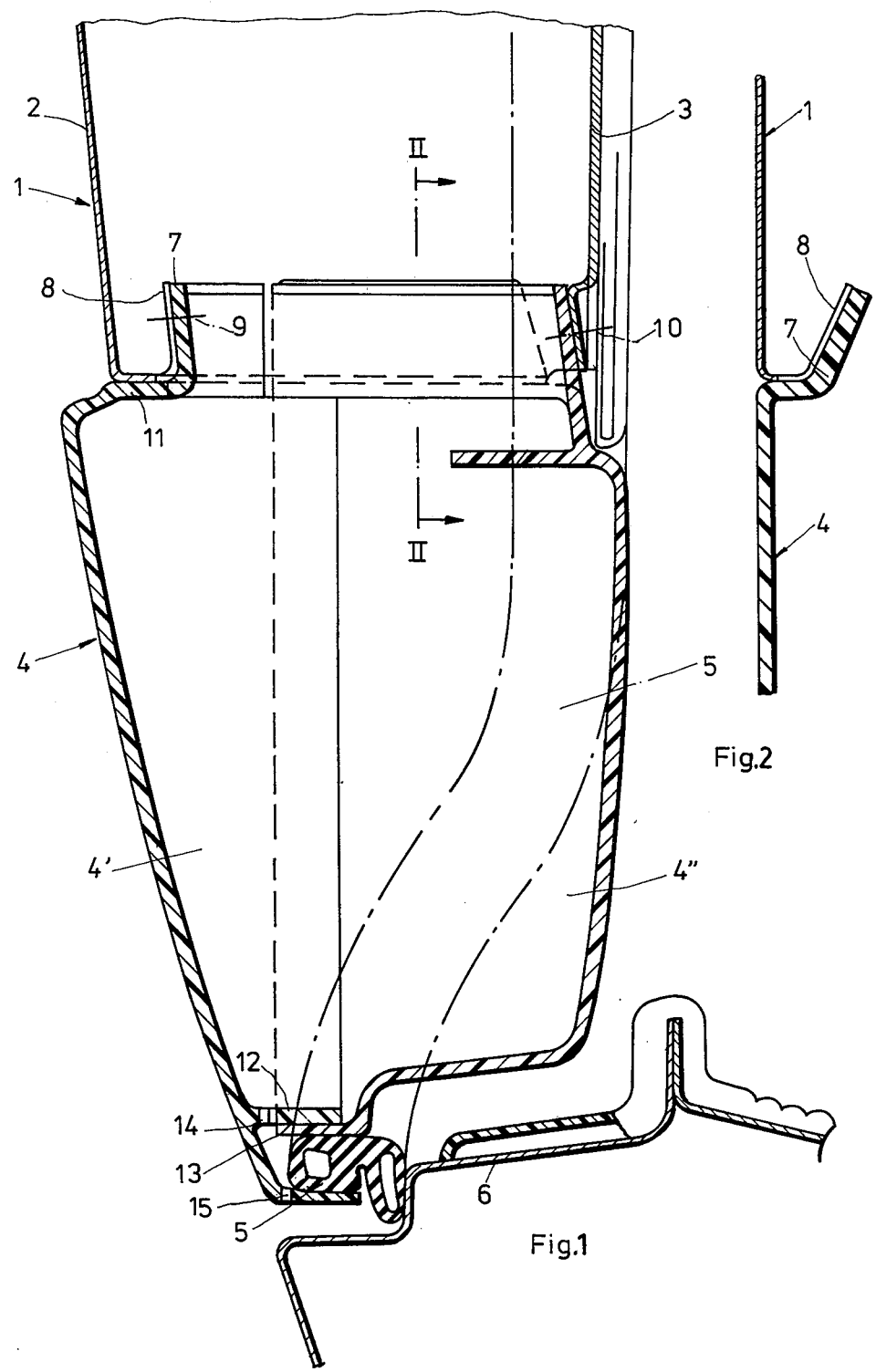

DOOR FOR A VEHICLE

BACKGROUND OF THE INVENTION

The invention relates to a door for a vehicle, particularly a motor vehicle.

The German Auslegeschrift (DAS) No. 1,480,089 discloses a door having a frame surrounding a window cutout constituting an upper region, and a supporting device which is potted in a synthetic resin body constituting a lower region. Viewed from outside the door, this synthetic resin body extends upward as fas as the lower edge of the window cutout.

A door with its lower part made of plastic has the advantage of reducing the possibility of corrosion. It is precisely the lower part of the door which is most exposed to corrosion and this part is made of a material which does not exhibit a tendency to corrode as does sheet metal. In addition, the weight of the door is reduced, in comparison with the weight of a door made completely of metal. However, in the mass production of such a door, these advantages are offset by disadvantages which make it practically unfeasible. During the potting process, the upper area of the door—i.e., the part made of sheet metal—must also be placed in the mold, resulting in considerable expenditure for large molds which are occupied for long periods of time during curing.

This known construction is also unsatisfactory because any damage to the door, when mounted in a vehicle, makes it necessary to replace the entire door since the two areas cannot be separated from one another.

SUMMARY OF THE INVENTION

An object of the present invention is to provide a door for a vehicle, particularly a motor vehicle, having an upper region provided with a window opening and made of sheet metal, and a lower region made of plastic material which exhibits all the advantages of the prior doors of this type and which can be manufactured at a cost which is acceptable, even for large scale mass production.

It is a further object of the present invention to provide a door of the type noted above which may be easily repaired, if damaged, without requiring replacement of the entire door panel.

These objects, as well as other objects which will become apparent from the discussion that follows are achieved, according to the present invention, by assembling the door from two prefabricated components which are separately manufactured and constitute the upper and lower door regions, respectively. The upper component is made of sheet metal, and the lower component is made of a suitable plastic which can be reinforced, for example by means of glass fibers. The components are connected together at the level of the vehicle bumper or bumpers by boundary zones on each component which overlap and face one another.

Thus, an essential feature of the vehicle door according to the present invention lies in the choice of the height of the connection between the two components. The connection is located at the level of the vehicle bumper, and hence of the bumpers of other vehicles, so that the overlapping boundary zones of the two components of the door automatically produce a reinforcement at this vulnerable level, as if a longitudinal member were present. Since the lower component naturally extends only up to this level, only small molds are required for its manufacture. Such molds may be uncomplicated, especially where this lower component is, in turn, constructed as a multi-component unit.

The fact that the lower component is initially manufactured separately from the upper component, and only later combined therewith, has the additional advantage that the lower component can easily be replaced if damaged.

The separate manufacture of the two components of the door according to the invention also has a favorable effect upon production in quite a different sense. Since the doors intended for various types of vehicles differ from one another primarily in their lower areas in the vicinity of the sill, the upper component used in the door according to the invention can be employed for all doors for different types of vehicles, whereby the individual shape of the door can be provided for the individual type of vehicle by selecting an appropriately prefabricated lower component, which is releasably connected with the upper component. A releasable connection will be understood to be any connection which can be released without destroying one of the two components of the door according to the invention. For example, adhesive connections can be used; in addition, rivets, screws, and even clips can be used to join the upper and lower components.

If the lower component extends with its boundary zones into the upper component of the door, the boundary zones may be constructed as reinforcing support shapes extending substantially horizontally—i.e., lengthwise in the door—which stiffen the door at this particularly critical bumper height. The door may also be stiffened at this level by providing on the lower component and externally-projecting, substantially horizontal support surface for the upper component.

BRIEF DESCRIPTION OF THE DRAWINGS

FIG. 1 is a vertical cross-section through a vehicle door, according to the present invention, showing the leading edge of the door from its inside.

FIG. 2 is a cross-sectional view of a portion of the door of FIG. 1 taken along the line II—II.

DESCRIPTION OF THE PREFERRED EMBODIMENTS

Figure 3:
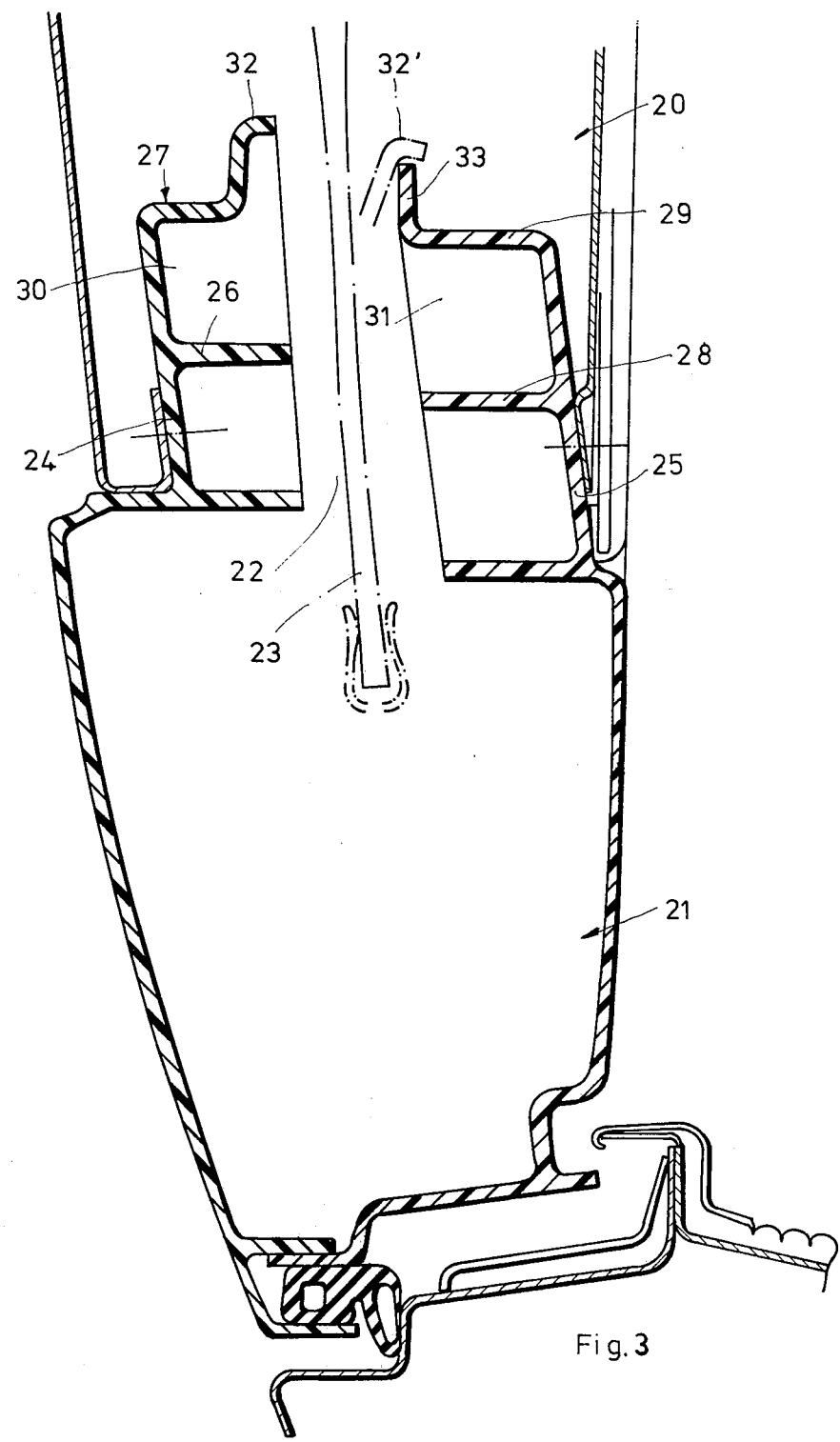
FIG. 3 is a vertical cross-section through a vehicle door, according to the present invention, having a pocket for a window and a window crank disk.

In the embodiment shown in FIG. 1, the door is constructed in the usual manner with an upper component 1 made of sheet metal with an outside panel 2 and an inside panel 3, as well as a lower component 4 made of an appropriate plastic. The lower part rests against the usual door sill 6 of a vehicle, stressing a door seal 5, when the door is closed. The two components 1 and 4, as indicated by the fact that they are made of different materials, are therefore manufactured separately and assembled as finished components in such a manner that boundary zones 7, which may be discontinuous if desired, of the lower component 4 are pushed upward from below into corresponding boundary zones 8 of the upper component 1. The upper and lower components 1 and 4 are joined together in the region of these boundary zones 8 and 7, respectively, by connecting means indicated at 9 and 10. As an example, the connecting means may be an adhesive or a number of rivets. Boundary zones 7, 8 are in the height range of the bumpers of the vehicle, assuming that the vehicle is provided with bumpers of at least approximately the same height so that, in its particularly vulnerable height range, the door is reinforced by the connecting area with a double wall thickness (produced by the overlapping boundary zones).

The design of the boundary zones 7 and 8 at the leading edge wall of the door is shown in cross-section in FIG. 2.

Reinforcement in this height range is also provided by a substantially horizontal surface 11 of the lower component 4 which supports the outside door panel 2. At this point, the lower component 4 projects slightly beyond outside panel 2.

As is already apparent from this description of the door according to the invention, the door is made of corrosion-resistant plastic in its lower area which is the area most susceptible to corrosion and damage; in addition, the lower component 4 is relatively easily removed from the door, making the door less expensive to repair.

In the embodiment shown in FIG. 1, the lower component 4 is also comprised of two parts 4' and 4", which are joined together in a plane parallel to the plane of the door, with their boundary zones 12 and 13 overlapping. Not only does this result in a simplification of the molds for manufacturing lower component 4, but as is discussed in greater detail with reference to FIG. 4, it also makes possible the provision of an insert which forms a support shape in the boundary zones 7 and 8.

In FIG. 1, the numerals 14 and 15 designate openings (weep holes) to allow water to escape from the door.

Turning to the embodiment according to FIG. 3, the door will be seen again to consist of two components 20 and 21, of which only the lower component 21 is made of plastic. It has basically the same form as the lower component 4 in FIG. 1, but in this case the cross section is through the middle of the door; i.e., at the point where a pocket 22 for the crank-operated window indicated by 23 must be provided. Also in this embodiment the boundary zones of the lower component 21 are extended to form a lengthwise support which reinforces the door. In addition, the outer boundary zones 24 and inner boundary zones 25 are extended by essentially horizontal walls or ribs 26, 27 or 28, 29, running across practically the entire width of the door, as well as by vertical walls or ribs 30 or 31, which constitute support channels open toward the crank-operated window 23. The upper wall 27 has an approximately hook-shaped projection 32 in this vertical cross section, by means of which, as indicated at 32', it fits over the wall 29 in the event of an impact, possibly after destruction of the crank-operated window. This produces a "hooking effect," which simultaneously allows the lower component 21 to become a closed support channel.

Figure 4:
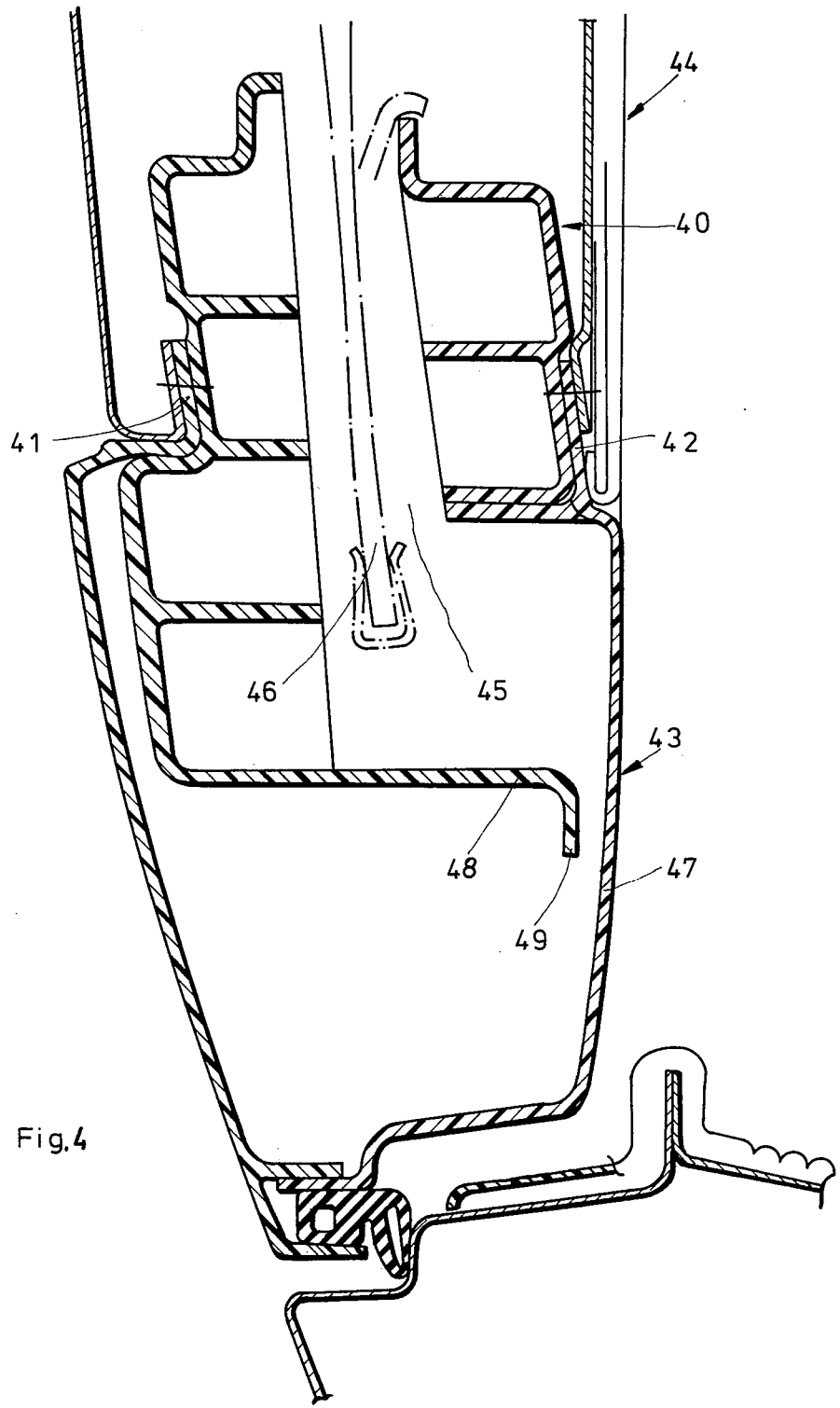
FIG. 4 is a vertical cross-section through a vehicle door, according to an alternative embodiment of the present invention, having a pocket for a window and a window crank disk.

While in the embodiment according to FIG. 3, discussed above, the boundary zones 24 and 25 of lower door component 21 are in turn components of a side-member arrangement, in the design according to FIG. 4 the side-member arrangement is obtained by an insert 40 which is mounted between the outer boundary zone 41 and the inner boundary zone 42 of the lower component 43. This insert 40 extends partially into the upper component 44 and partially into the lower component 43 of the door, thereby effecting a reinforcement or stiffening of the door over a relatively large height range. The insert 40 also extends essentially over the entire width of the door. It is formed by horizontal and vertical walls or ribs in such manner that open-channel supports are produced facing the pocket 45 for the crank-operated window 46. This area of the insert 40, which projects into the lower door component 43, is provided on one side only with walls or ribs to form half-closed support members, and is provided also with a projection 48 facing toward the inside wall 47 of the lower component which, upon impact, abuts the inside wall 47 with its edge 49 over as great a length as possible.

Figure 5:
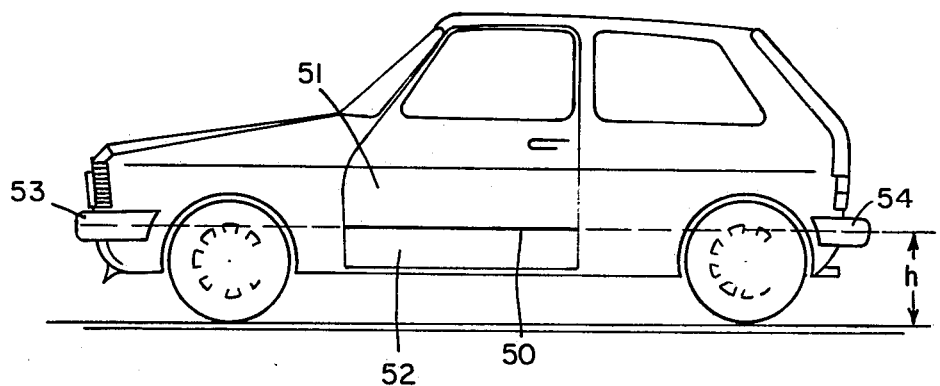
FIG. 5 is a side view of a vehicle having a door in accordance with the present invention.

FIG. 5 shows a vehicle in accordance with the invention wherein the upper door portion 51 and the plastic lower door portion 52 meet along a junction 50 which is at the same height h as the vehicle bumpers 53 and 54.

In all of the embodiments, the lower door component at its upper end projects slightly over or outward from the outside panel of the upper door component, thereby not only producing greater strength, but also blending the different finishes resulting from the use of different materials. Of course, a trim strip can be provided at this point, or all problems relating to the slightly different surfaces of the two components can be overcome by using different colors for the two different components.

While there have been described what are believed to be the preferred embodiments of the invention, those skilled in the art will recognize that various changes and modifications may be made thereto without departing from the spirit of the invention, and it is intended to claim all such embodiments as fall within the true scope of the invention.

I claim:

1. In a door for a vehicle, particularly a motor vehicle with at least one bumper, said door having an upper region made of sheet metal and provided with a window opening, and a lower region made of plastic material, the improvement wherein said door comprises two prefabricated components which are separately manufactured and assembled together, a first component forming the upper region and a second component forming the lower region of the door, and wherein said first and second components are joined at respective lower and upper edges, said edges having overlapping, facing boundary zones which are connected together at the level of the vehicle bumper to form a horizontal joint in the vehicle door between the two components.

2. The door defined in claim 1, wherein said second component comprises two parts, each having facing, overlapping boundary zones which are connected together along a plane substantially parallel to the plane of the door.

3. The door defined in claims 1 or 2, wherein said second component extends upward with its boundary zones into said first component.

4. The door defined in claim 3, wherein the boundary zones of said second component include substantially horizontal, door-reinforcing profile supports.

5. The door defined in claim 3, further comprising a substantially horizontally extending profile support forming a door reinforcing insert, and wherein the boundary zones of said second component surround and hold said insert, said insert extending upward at least partially into said first component.

6. The door defined in claim 1, wherein said second component has a substantially horizontal support surface for supporting said second component.

7. The door defined in claim 6, wherein said horizontal support surface extends outwardly beyond the external surface of said first component.

* * * * *